United States Patent [19]

Williams

[11] Patent Number: 5,109,800
[45] Date of Patent: May 5, 1992

[54] INSECT BARRIER STAND

[76] Inventor: Willard J. Williams, Yacht Haven Marina, Berth 202, Wilmington, Calif. 90744

[21] Appl. No.: 729,321

[22] Filed: Jul. 12, 1991

[51] Int. Cl.⁵ ............................................. A01K 5/00
[52] U.S. Cl. ...................................................... 119/61
[58] Field of Search ................ 119/61, 51.5; 43/132.1, 43/124, 121, 133, 136, 107; 220/729, 730, 625, 574

[56] References Cited

U.S. PATENT DOCUMENTS

| | | | |
|---|---|---|---|
| 2,167,978 | 8/1939 | Jennerich | 43/121 |
| 3,441,003 | 4/1969 | Du Mond et al. | 43/121 |
| 4,784,086 | 11/1988 | Hand et al. | 119/61 |
| 4,803,954 | 2/1989 | Welch et al. | 119/61 |

Primary Examiner—Gene Mancene
Assistant Examiner—Thomas Price
Attorney, Agent, or Firm—Roger A. Marrs

[57] ABSTRACT

A stand or platform is disclosed herein for preventing insects such as ants from reaching or having access to pet feeding bowls, trash cans or the like. The stand includes a circular inverted disc having an outwardly and downwardly sloping sidewall terminating in a circular supporting edge disposed on a floor, pavement or the like. The center of the stand is provided with a raised hub on which a securement material is carried for engagement with the bowl or container intended to be protected from insects. An intermediate barrier segment integrally connects the raised hub with the sloping sidewall on which a continuous circular strip of removable material is carried that is coated with an insect deterrent. The periphery of the sloping sidewall extends beyond the periphery of the bowl or container so that spilled food, trash, etc. will fall away or be conducted away from the stand.

6 Claims, 1 Drawing Sheet

INSECT BARRIER STAND

BACKGROUND OF THE INVENTION

1. Field of the Invention

The present invention relates to the field of sanitary devices, and more particularly to a novel insect barrier stand device maintaining trash barrels, garbage pails, animal food dishes and the like free from crawling insects, such as ants, roaches and other vermin.

2. Brief Description of the Prior Art

In the past, it has been the conventional practice to place trash, refuse, debris and the like into plastic bags for disposal in containers, such as barrels. Usually, the filled barrels or trash cans are located outside of a structure and the contents of the cans and barrels are attractive to crawling pests and insects, such as ants or the like. In other instances, animal food dishes similarly attract pests so that such cans, barrels and dishes are unsightly and unsanitary.

Although some attempts have been made to isolate such trash containers and food dishes by sprinkling disinfectant or other substances about the area to be sanitized, such attempts have not been wholly successful because ants can oftentimes find tracks or trails in which to travel through such barriers. In other instances, attempts have been made to place a water barrier between the attraction and the insect. These attempts have also been unsuccessful inasmuch as many of the insects have the ability to swim, hop or otherwise cross the water barrier even though some insects are prevented from crossing.

Problems have been encountered when food, trash or the like spills or falls from its container such as when an animal is feeding wherein such spillage oftentimes provides a bridge over the moat or barrier material.

Therefore, a long-standing need has existed to provide a support for barrels and dishes that will releasably hold barrels, cans, dishes or the like, and which will provide a major barrier across which insects cannot travel. Furthermore, such a barrier must not be detrimental to the health or safety of animals or persons coming into contact with the barrier or in close proximity therewith.

SUMMARY OF THE INVENTION

Accordingly, the above problems and difficulties are obviated by the present invention which provides a novel insect barrier platform or stand which supports a feeding bowl, trash container or the like, and which includes a circular disc having an outwardly and downwardly curved sloping sidewall which terminates in a supporting edge engageable with the floor or pavement on which the device is supported. The stand or platform further includes a central hub which is raised so as to support a bowl or container thereon wherein the underside of the bowl or container will be in fixed spaced-apart relationship from the platform or stand on which it is supported. The raised hub further includes a flat supporting surface for carrying a securement means releasably attachable with the underside of the bowl or container intended to be supported. Interconnecting the raised hub with the downwardly and outwardly sloping curved sidewall, there is provided a barrier segment on which a suitable insect repellent or deterring composition is carried. The repellent is carried in the space defined between the undersurface of the bowl or container and the surface of the segment carrying the barrier deterrent or repelling material. In one form, the repellent means is a continuous circular strip of easily removable material, such as tape, and a coating of ant deterrent or other insect deterrent composition is placed. Preferably, the composition is non-toxic and safe for pets and children.

An important feature resides in the fact that the outer perimeter and periphery of the circular sidewall extends beyond the perimeter of the bowl or container on which it is supported so that spillage of food or the like will tumble away from the stand and not form a bridge over the gap between the supporting stand and the understand of the bowl or container.

Therefore, it is among the primary objects of the present invention to provide a novel means for retarding or preventing insects from reaching the contents of trash barrels, animal food dishes or the like so that unsightly and unsanitary conditions are avoided.

Another object of the present invention is to provide a means for trash barrels or food dishes in such a way that insects are prevented from reaching the container or the dish and that the creation of food or trash bridges across the insect barrier is avoided.

Still a further object of the present invention is to provide a novel stand or platform for supporting animal food dishes, trash containers or the like which includes a means for supporting the bowl or container above an insect deterrent barrier so that the underside of the container is separated from the barrier and that no food spillage can cross or bridge the barrier.

Yet another object of the present invention is to provide a relatively inexpensive and economic means for providing a sanitary barrier about animal food dishes and trash barrels or containers whereby crawling insects are prevented from reaching the contents of the cans, barrels or animal food dishes and which includes a means for replacing the sanitary barrier when it is no longer fresh or able to prevent passage of insects.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
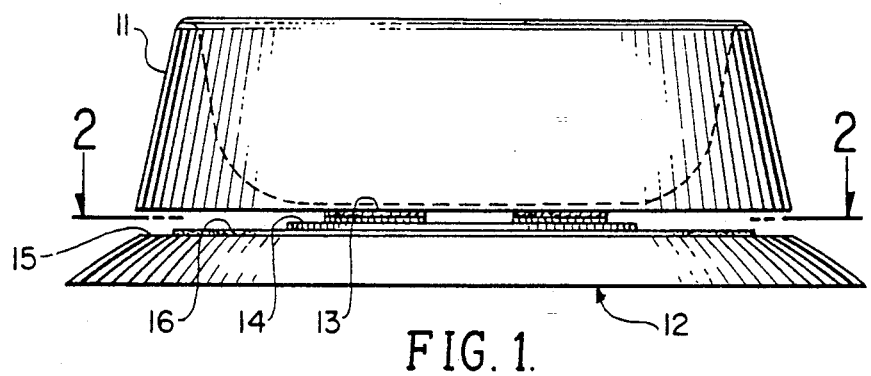
FIG. 1 is a front elevational view of the novel insect barrier stand incorporating the present invention.

Referring to FIG. 1, the novel stand or base for supporting a pet feeding bowl or a trash can or the like is indicated in the general direction of arrow 10 wherein a typical bowl or container is indicated by numeral 11 and the stand by numeral 12. It is to be noted that the stand 12 is underneath the bowl or container 11 and is attached thereto by a detachable fastening means 13, such as is represented by a conventional hook and pile peelapart fastening system. In such an arrangement, the hook or pile element is attached to the undersurface of the bowl or container 11 while the other component is attached to the center of a raised hub 14 carried in a central portion on an upper surface or segment 15 of the stand 12. Therefore, it can be seen that a space is defined between the undersurface of the bowl or container 11 and the top or segment surface 15 of the stand 12. The height of the opening is determined primarily by the height of the raised hub 14 and the fastening means 13. However, sufficient space is available for depositing a barrier strip which may be composed of an insect poison of conventional composition. Any insect deterrent or repelling substance may be used, including impassable glue or the like as long as the substance or composition is non-toxic to humans or pets and has a reasonable life. It is to be understood that the barrier strip may be removed when it is no longer active for its intended purpose and it may readily be replaced with a fresh strip of repelling substance.

Furthermore, it is to be understood that semi-viscous material such as stored in a squeeze tub may be applied directly to the surface 15 instead of a repellent strip as desired by the user. However, the height of the deposited material must be closely controlled so as not to fully occupy the space between the undersurface of the container or bowl and the stand 12.

Figure 2:
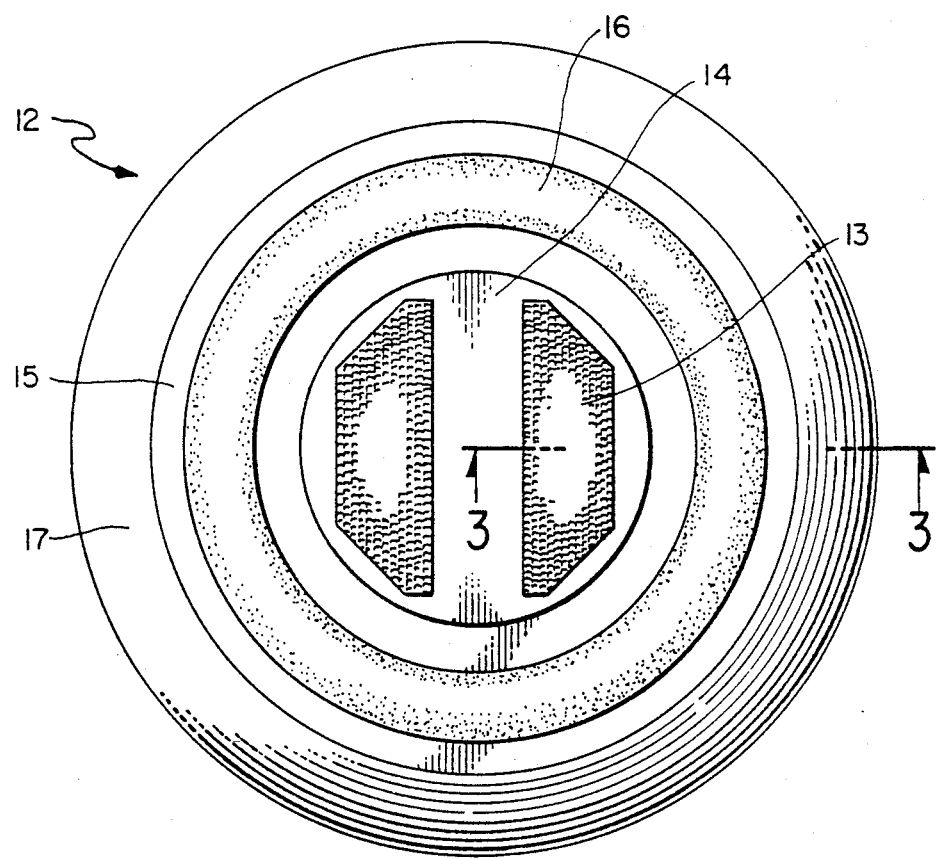
FIG. 2 is a cross-sectional view of the insect barrier stand shown in FIG. 1 as taken in the direction of arrows 2—2 thereof.

Referring now in detail to FIG. 2, it can be seen that the stand 12 is circular in configuration and that the barrier strip 16 as well as the hub 14 are coaxially disposed with respect to one another.

Figure 3:
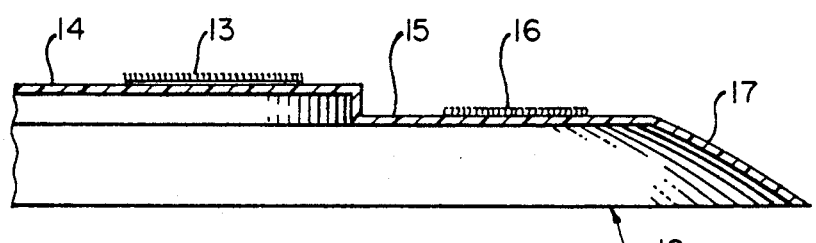
FIG. 3 is an enlarged fragmentary view in section showing a portion of the insect barrier stand taken in the direction of arrows 3—3 of FIG. 2.

Referring now in detail to FIGS. 2 and 3, it is to be particularly noted that the outer edge marginal region of the stand 12 includes an outwardly and downwardly sloping sidewall 17 which is intended to be outside of the sidewall of the bowl or container carried on the hub 14. By providing such a curved or rounded outer shoulder, any food droppage or spillage from the bowl or container will automatically roll away from the stand and will not form a bridge from the stand to the bowl as would be the case with prior feeders and containers. Referring further to FIG. 3, it can be seen that the underside of the stand 12 is substantially hollow and that the sidewall and segment surface 15 as well as the hub 14 may readily be composed of a high-2-strength ratio material such as plastic or the like.

Therefore, in view of the foregoing, it can be seen that the novel stand of the present invention provides a means for releasably retaining a bowl or container in spaced-apart relationship with the stand so that an area is provided for holding a quantity of insect repelling composition so that the insects are deterred from gaining access to the bowl or container. The stand takes the form of a detachable disc that serves as a base for the feeder bowl or trash container. The stand or disc is elevated at its central area by the raised hub 14 so as to provide enough elevation for the bottom rim of the feeder bowl or container and the surface of the disc stand to prohibit insects from having access to the base of the bowl or container. The perimeter or outer periphery of the stand extends beyond the bottom rim of the feeder bowl or container with sufficient distance to inhibit the feeder bowl from making contact with a vertical object such as a wall whereby eliminating another insect access to the feeder bowl. The continuous circular strip of insect barrier substance 16 is easily removable such as applying the material on a tape. The strip may be coated with any kind of insect deterrent and is preferably of a non-toxic and safe composition for pets and humans. As an alternate, the strip may also be coated with a never-dry glue, such as flypaper glue or the like, which would trap insects attempting to cross the barrier. The barrier strip or deterrent material is placed on the disc or stand surface 15 near to the hub 14 and far enough in from the bottom rim of the feeder bowl or container to inhibit contact with it by a pet so that the pet has no access to the toxic material comprising the barrier strip. The strip or other material may be readily removable so that when no longer effective, the strip or material can be removed or replaced with a fresh strip or material. It is for this reason that the fastening means 13 is provided for detachably connecting the bowl or container to the stand.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A stand for supporting a bowl or can comprising:
   a bowl-like container having a downwardly sloping sidewall spaced above a bottom;
   a base having a central portion and an edge marginal region integrally joined with said central portion by a surrounding flat planar platform;
   said base central portion including a raised hub above said surrounding platform so as to define a gap between said container sidewall and said edge marginal region;
   said edge marginal region is a continuous downwardly sloping sidewall extending beyond said container bottom and positioned below said surrounding platform;
   an insect barrier disposed on said platform in spaced-apart relationship with respect to said raised hub and said edge marginal region; and
   detachable fastener means cooperatively carried on said container bottom and said raised hub for detachable connection of said container with said base raised hub.

2. The invention as defined in claim 1 wherein:
   said insect barrier is composed of an insect repelling substance.

3. The invention as defined in claim 2 wherein:
   said insect barrier is a strip of material carrying said insect repelling substance; and
   said strip is removable when effectiveness of said insect repelling substance is exhausted.

4. The invention as defined in claim 3 wherein
   said fastener means is a hook and pile fastener with a hook component on said raised hub and a pile component on said container bottom.

5. The invention as defined in claim 4 wherein
   said downwardly sloping edge marginal region is of curved cross-section along the length of said sidewall.

6. The invention as defined in claim 5 wherein
   said base is circular; and
   said raised hub, said insect barrier and said edge marginal region are coaxially disposed with respect to each other.

* * * * *